(12) United States Patent
Penfold

(10) Patent No.: US 8,448,154 B2
(45) Date of Patent: May 21, 2013

(54) METHOD, APPARATUS AND SOFTWARE FOR PROCESSING SOFTWARE FOR USE IN A MULTITHREADED PROCESSING ENVIRONMENT

(75) Inventor: Colin Penfold, Swanmore (GB)

(73) Assignee: International Business Machines Corporation, Armonk, NY (US)

( * ) Notice: Subject to any disclaimer, the term of this patent is extended or adjusted under 35 U.S.C. 154(b) by 1508 days.

(21) Appl. No.: 12/025,112

(22) Filed: Feb. 4, 2008

(65) Prior Publication Data

US 2009/0198968 A1    Aug. 6, 2009

(51) Int. Cl.
G06F 12/00 (2006.01)
G06F 12/14 (2006.01)
G06F 9/30 (2006.01)
G06F 9/40 (2006.01)
G06F 9/44 (2006.01)
G06F 9/45 (2006.01)
G06F 9/46 (2006.01)

(52) U.S. Cl.
USPC ........... 717/149; 710/200; 712/215; 717/106; 717/140; 717/170; 718/100; 718/102; 718/104; 718/106

(58) Field of Classification Search
None
See application file for complete search history.

(56) References Cited

U.S. PATENT DOCUMENTS

| | | | |
|---|---|---|---|
| 5,481,706 A * | 1/1996 | Peek | 710/200 |
| 6,604,125 B1 * | 8/2003 | Belkin | 718/104 |
| 6,769,122 B1 * | 7/2004 | Daudel | 718/102 |
| 7,117,498 B2 * | 10/2006 | Li | 718/102 |
| 7,299,471 B2 * | 11/2007 | Cheung et al. | 718/107 |
| 7,827,559 B1 * | 11/2010 | Rhee et al. | 718/104 |
| 7,853,951 B2 * | 12/2010 | Rosenbluth et al. | 718/104 |
| 7,890,735 B2 * | 2/2011 | Tran | 712/215 |
| 2003/0233393 A1 * | 12/2003 | Li | 709/107 |
| 2004/0128489 A1 * | 7/2004 | Wang et al. | 712/235 |
| 2005/0262490 A1 * | 11/2005 | Thomborson et al. | 717/145 |
| 2006/0200823 A1 * | 9/2006 | Rodeheffer et al. | 718/100 |
| 2007/0011671 A1 * | 1/2007 | Kahlon et al. | 717/170 |
| 2007/0220493 A1 * | 9/2007 | Morizawa | 717/126 |
| 2007/0226683 A1 * | 9/2007 | Stoodley et al. | 717/106 |
| 2007/0239915 A1 * | 10/2007 | Saha et al. | 710/200 |
| 2007/0245312 A1 * | 10/2007 | Qadeer et al. | 717/124 |
| 2007/0266387 A1 * | 11/2007 | Henmi | 718/102 |
| 2008/0209436 A1 * | 8/2008 | Agha et al. | 718/106 |
| 2009/0049545 A1 * | 2/2009 | Nagpal et al. | 726/22 |
| 2011/0067011 A1 * | 3/2011 | Wang et al. | 717/140 |

OTHER PUBLICATIONS

Huo Yan Chen, Analysis of Potential Deadlock in Java Multithreaded Object-Oriented Programs, Oct. 2005 IEEE [Retrieved on Jan. 8, 2013]. Retrieved from the internet: <URL: http://ieeexplore.ieee.org/stamp/stamp.jsp?tp=&arnumber=1571136> 5 Pages (146-150).*

Jessica Chen, On Verifying Distributed Multithreaded Java Programs, 2000, [Retrieved on Jan. 8, 2013]. Retrieved from the internet: <URL: http://link.springer.com/content/pdf/10.1023%2FA%3A1008982122316> 21 Pages (322-341).*

Chunqing Wu et al., The Impact of Parallel and Multithread Mechanism on Network Processor Performance, 2006 IEEE, [Retrieved on Jan. 8, 2013]. Retrieved from the internet: <URL: http://ieeexplore.ieee.org/stamp/stamp.jsp?tp=&arnumber=4031461> 5 Pages (236-240).*

* cited by examiner

Primary Examiner — Don Wong
Assistant Examiner — Anibal Rivera
(74) Attorney, Agent, or Firm — Hamilton & Terrile, LLP; Stephen A. Terrile

(57) ABSTRACT

A method, apparatus and software for processing software code for use in a multithreaded processing environment in which lock verification mechanisms are automatically inserted in the software code and arranged to determine whether a respective shared storage element is locked prior to the use of the respective shared storage element by a given processing thread in a multithreaded processing environment.

12 Claims, 5 Drawing Sheets

```
DCL: V binary;      /* defines the storage of variable V */

V = V+1;            /* Increments the variable V */

X = V;              /* Sets the variable X to the contents of V */

X = V;              /* Sets the variable X to the contents of V then */
V = 0;              /* resets V to 0                                */
```

```
?V: THREADSAFE(binary), METHODS(INC,GET,RESET), LOCK(LOCAL);

INC_THREADSAFE(V#);

X = GET_THREADSAFE(V#);

X = RESET_THREADSAFE(V#);
```

```
DCL: V binary;          /* defines the storage of variable V */

V = V+1;                /* Increments the variable V */

X = V;                  /* Sets the variable X to the contents of V */

X = V;                  /* Sets the variable X to the contents of V then */
V = 0;                  /* resets V to 0                                 */
```

Figure 3a

```
?V: THREADSAFE(binary), METHODS(INC,GET,RESET), LOCK(LOCAL);

INC_THREADSAFE(V#);

X = GET_THREADSAFE(V#);

X = RESET_THREADSAFE(V#);
```

Figure 3b

```
DCL: V# Binary;

INC_THREADSAFE(V#);
  ASSERT_LOCAL_LOCK;
  V#=V#+1;
END INC_THREADSAFE;

GET_THREADSAFE(V#);
  ASSERT_LOCAL_LOCK;
  RETURN(V#);
END GET_THREADSAFE;

RESET_THREADSAFE(V#);
  DCL: Y binary;
  ASSERT_LOCAL_LOCK;
  Y = V#;
  V# = 0;
  RETURN(Y);
END GET_THREADSAFE;
```

Figure 3c

METHOD, APPARATUS AND SOFTWARE FOR PROCESSING SOFTWARE FOR USE IN A MULTITHREADED PROCESSING ENVIRONMENT

FIELD OF INVENTION

The present invention relates to a method apparatus or software for processing software for use in a multithreaded processing environment.

BACKGROUND OF THE INVENTION

Some software code, in particular older software code, is written for use in single threaded processing systems. Development tools, such as compilers and testing systems exist for use in the conversion of single threaded software for use in multithreaded processing environments. The converted code is commonly referred to as threadsafe code and the conversion process is referred to as a threadsafe conversion process. The threadsafe conversion process is arranged to ensure that variables that are common or shared between multiple threads in the multithreaded processing environments are shared safely, that is, ensuring that changes are made to the variable are made in a controlled way. Such conversion of the original code to threadsafe code typically involves applying locking mechanisms to the sections of code that modify the shared variables. This is commonly achieved by recasting the shared variables as objects. The statements that operate on those variables may also be recast as methods that operate on the corresponding recast objects. The methods may then be used to obtain an appropriate lock prior to using the corresponding variable.

One problem with the above arrangement is that locking mechanisms incur a significant processing overhead. Therefore, some restructuring of the code is commonly performed to reduce the number of locking mechanisms required. However, when changes are made to the original code that affects a shared variable, a new version of the threadsafe code must be produced. Producing a new version of the code requires significant amounts of engineering and processing resources and is prone to errors being introduced to the software.

SUMMARY OF THE INVENTION

An embodiment of the invention provides a method for processing software for use in a multithreaded processing environment. The method includes the steps of identifying a storage element in a portion of single threaded software code wherein the storage element is sharable between two or more processing threads in a multithreaded processing environment, converting the portion of single threaded software code for use in a multithreaded processing environment by recasting the storage element as an object and any statements operating on the storage element as respective methods on the object, applying a locking mechanism to the identified storage element, and automatically inserting a lock verification mechanism in each respective method, the lock verification mechanism being arranged to determine whether the applied locking mechanism has locked the identified shared storage element for a given processing thread in the multithreaded processing environment, prior to use of the identified shared storage element by the processing thread.

A predetermined association may be provided between the locking mechanism and the storage element declaration. The locking mechanism may be selected from a predetermined set of provided locking mechanisms. A predetermined set of methods for operating on the storage element may be associated with the storage element declaration. The storage element declaration may be one of a predetermined set of identified storage element declarations in the software code. The software code may comprise a plurality of sections and the step of automatically inserting a lock verification mechanism may be arranged for selective enablement for a given section.

Another embodiment provides a method for processing software for use in a multithreaded processing environment. The method includes the steps of identifying a storage element in a portion of single threaded software code wherein the storage element is sharable between two or more processing threads in a multithreaded processing environment, converting the portion of single threaded software code for use in a multithreaded processing environment and applying a locking mechanism to any statements operating on the identified storage element, and automatically inserting a lock verification mechanism in the software code, the lock verification mechanism being arranged to determine whether the locking mechanism has locked the identified shared storage element for a given processing thread in the multithreaded processing environment, prior to any use of the identified shared storage element by the processing thread.

A further embodiment provides apparatus for processing software for use in a multithreaded processing environment. The apparatus is operable to identify a storage element in a portion of single threaded software code wherein the storage element is sharable between two or more processing threads in a multithreaded processing environment, convert the portion of single threaded software code for use in a multithreaded processing environment by recasting the storage element as an object and any statements operating on the storage element as respective methods on the object, apply a locking mechanism to the identified storage element, and automatically insert a lock verification mechanism in each respective method, the lock verification mechanism being arranged to determine whether the applied locking mechanism has locked the identified shared storage element for a given processing thread in the multithreaded processing environment, prior to use of the identified shared storage element by the processing thread.

Another embodiment provides apparatus for processing software for use in a multithreaded processing environment. The apparatus is operable to identify a storage element in a portion of single threaded software code, wherein the storage element is sharable between two or more processing threads in a multithreaded processing environment, convert the portion of single threaded software code for use in a multithreaded processing environment and applying a locking mechanism to any statements operating on the identified storage element, and automatically insert a lock verification mechanism in the software code, the lock verification mechanism being arranged to determine whether the locking mechanism has locked the identified shared storage element for a given processing thread in the multithreaded processing environment, prior to any use of the identified shared storage element by the processing thread.

A further embodiment provides a group of one or more programs arranged to enable a group of one or more programmable devices to perform a method for processing software for use in a multithreaded processing environment. The method includes the steps of identifying a storage element in a portion of single threaded software code wherein the storage element is sharable between two or more processing threads in a multithreaded processing environment, converting the portion of single threaded software code for use in a multithreaded processing environment by recasting the storage element as an object and any statements operating on the storage element as respective methods on the object, applying a locking mechanism to the identified storage element, and automatically inserting a lock verification mechanism in each respective method, the lock verification mechanism being arranged to determine whether the applied locking mechanism has locked the identified shared storage element for a given processing thread in the multithreaded processing environment, prior to use of the identified shared storage element by the processing thread.

Another embodiment provides a group of one or more programs arranged to enable a group of one or more programmable devices to perform a method for processing software for use in a multithreaded processing environment. The method includes the steps of identifying a storage element in a portion of single threaded software code wherein the storage element is sharable between two or more processing threads in a multithreaded processing environment, converting the portion of single threaded software code for use in a multithreaded processing environment and applying a locking mechanism to any statements operating on the identified storage element, and automatically inserting a lock verification mechanism in the software code, the lock verification mechanism being arranged to determine whether the locking mechanism has locked the identified shared storage element for a given processing thread in the multithreaded processing environment, prior to any use of the identified shared storage element by the processing thread.

A further embodiment provides a group of one or more programs arranged to enable a group of one or more programmable devices to provide apparatus for processing software for use in a multithreaded processing environment. The apparatus is operable to identify a storage element in a portion of single threaded software code, wherein the storage element is sharable between two or more processing threads in a multithreaded processing environment, convert the portion of single threaded software code for use in a multithreaded processing environment by recasting the storage element as an object and any statements operating on the storage element as respective methods on the object, apply a locking mechanism to the identified storage element; and automatically insert a lock verification mechanism in each respective method, the lock verification mechanism being arranged to determine whether the applied locking mechanism has locked the identified shared storage element for a given processing thread in the multithreaded processing environment, prior to use of the identified shared storage element by the processing thread.

Another embodiment provides a group of one or more programs arranged to enable a group of one or more programmable devices to provide apparatus for processing software for use in a multithreaded processing environment. The apparatus is operable to identify a storage element in a portion of single threaded software code wherein the storage element is sharable between two or more processing threads in a multithreaded processing environment, convert the portion of single threaded software code for use in a multithreaded processing environment and applying a locking mechanism to any statements operating on the identified storage element, and automatically insert a lock verification mechanism in the software code, the lock verification mechanism being arranged to determine whether the locking mechanism has locked the identified shared storage element for a given processing thread in the multithreaded processing environment, prior to any use of the identified shared storage element by the processing thread.

BRIEF DESCRIPTION OF THE DRAWINGS

Embodiments of the invention will now be described, by way of example only, with reference to the accompanying drawings in which:

FIGS. 3a, 3b and 3c are examples of software code being processed in the software development system of FIG. 1.

DETAILED DESCRIPTION OF PREFERRED EMBODIMENTS OF THE INVENTION

Figure 1:
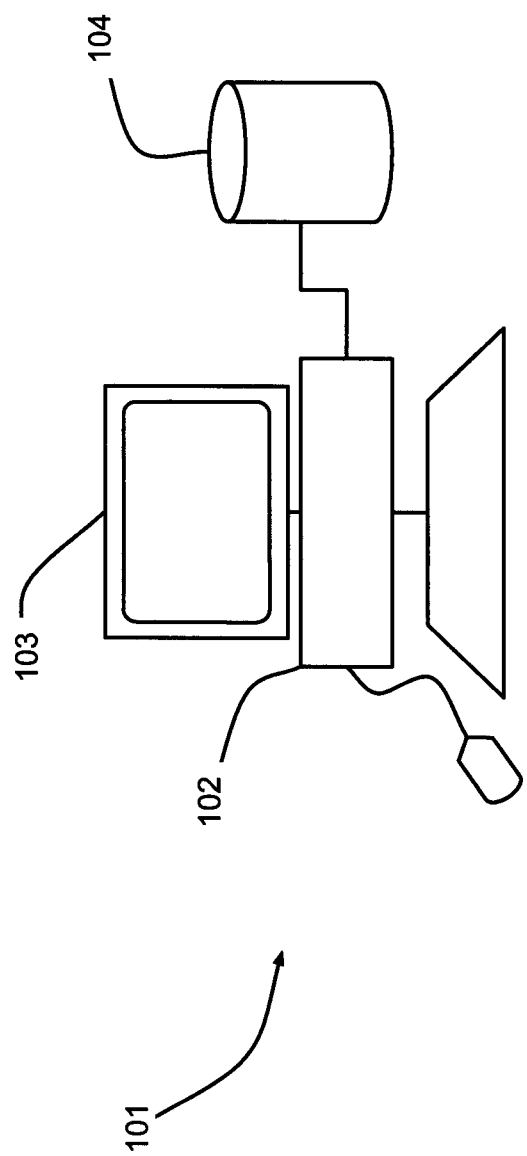
FIG. 1 is a schematic illustration of a computer system providing a software development system.
Figure 2:
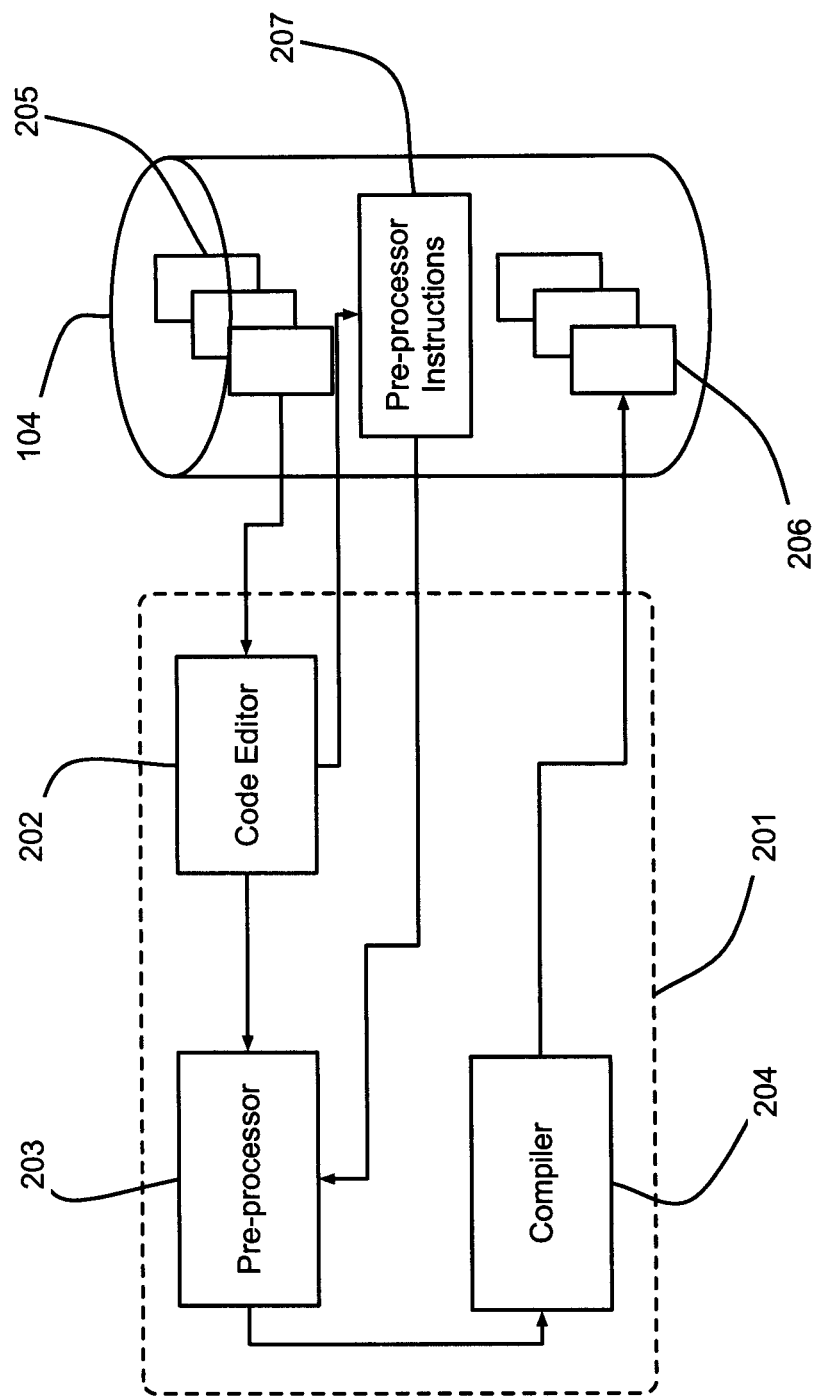
FIG. 2 is a schematic of elements of the software development system of FIG. 1.

With reference to FIG. 1, a computer system 101 comprises a computer 102 connected to a display 103 and a storage device 104. The computer 102 is loaded with software arranged to provide a software development system 201 as shown in FIG. 2. The software development system 201 comprises a code editor 202 arranged to communicate with a software code pre-processor 203, which in turn is arranged to communicate with a software code compiler 204. The code editor 202 enables an engineer to retrieve one or more of a first set of software code files 205 containing single threaded software code for editing. The code editor 202 and pre-processor 203 are arranged for converting the single threaded code 205 into threadsafe code 206.

The threadsafe conversion process is initiated by an engineer via the code editor 202 and in accordance with a set of predetermined procedures as described in further detail below. The threadsafe conversion process is completed by the pre-processor 203, which processes the edited single threaded software code 205 in accordance with a predetermined set of pre-processor instructions 207. The pre-processor 203 then passes the threadsafe but non-compiled version of the code to the compiler 204 for compilation into threadsafe object code 206.

FIG. 3a shows four example sections from the single threaded code 205. The first section in FIG. 3a comprises the declaration section in which a storage element, in the form of the variable "V", is declared as a variable of the type "binary". The second section in FIG. 3a shows an example of the use of the variable V in a variable statement where the variable is incremented. The third section shows the assignment of the value of the variable V to the variable X. The fourth section shows the resetting of the variable V to zero.

FIG. 3b shows the same four sections from the single threaded code 205 shown in FIG. 3a after having been edited by an engineer via the code editor 202 in readiness for processing by the pre-processor 203. In the edited single threaded code 205 the declaration and any use statement for the shared variable V have been modified. The modifications are arranged to assist the pre-processor in creating the pre-compile version of the threadsafe software code 206. For example, the declaration of the variable V has been modified to indicate to the pre-processor 203 that the variable V needs to be made threadsafe. The modified declaration recasts the variable as an object and indicates the type of data that the converted variable holds. In addition, the modified declaration identifies a set of methods for operating on the recast variable. In the present example, the methods arranged for operating on the object V are named "INC", "GET" and "RESET" and are arranged to provide increment, get and reset operations on the object V. The modified declaration also identifies a lock that will be used for locking the shared variable for a given processing thread. In the present embodiment, a locking mechanism provided for the object V is named "Local".

In addition to modifying the declaration of the shared storage element, each occurrence of the use of the variable, that is each statement, is also modified as shown in FIG. 3b. Each use of the variable in its non-threadsafe form is replaced with a call of the appropriate method. For example, the second section of the code that comprises a statement that increment the variable V and is thus replaced with a call to the method INC. In addition, all references to the non-threadsafe variable V are replaced with references to "V#" to refer to the threadsafe version of the variable. In the present embodiment, the methods arranged for operating on the new threadsafe object are created as part of the editing process and comprise part of the pre-processor instructions 207.

FIG. 3c shows modifications and additions to edited code of FIG. 3b that have been made as a result of the processing performed by the pre-processor 203. Firstly, the modified declaration statement has been replaced with a declaration of the threadsafe variable V#. A set of appropriate methods, corresponding to each of the three method calls, as identified in the modified declaration statement in FIG. 3b, have also been inserted in the code. In addition, the pre-processor is arranged to automatically insert an additional statement into each of the inserted methods, in the form of a lock assertion statement. Each lock assertion statement is placed immediately prior to the line in the method at which the threadsafe variable is to be accessed. The lock assertion statement is arranged to determine whether or not the lock associated with the threadsafe variable in the modified declaration, has been appropriately set at that point in the processing of the threadsafe code.

As will be understood by those skilled in the art, appropriate locks need to have been put in place outside of the inserted methods during editing process. Including such locks within the inserted methods may lead to inefficient code resulting from redundant locking or unlocking operations. In the present embodiment, the provided locking mechanisms are arranged to set a flag in the storage of a given processing thread to indicate whether a given lock has been obtained by the thread for a corresponding shared variable. The lock assertion statements inserted by the pre-processor are arranged to call a method that inspects the appropriate flag for a given lock to determine whether the flag is held or set by the current processing thread. If the flag is not set, an error message is generated and the processing of the software 206 stops or bends. Any such error messages thus enable the code to be modified to ensure that the appropriate lock is held prior to modification of a shared variable by a given processing thread.

Figure 4:
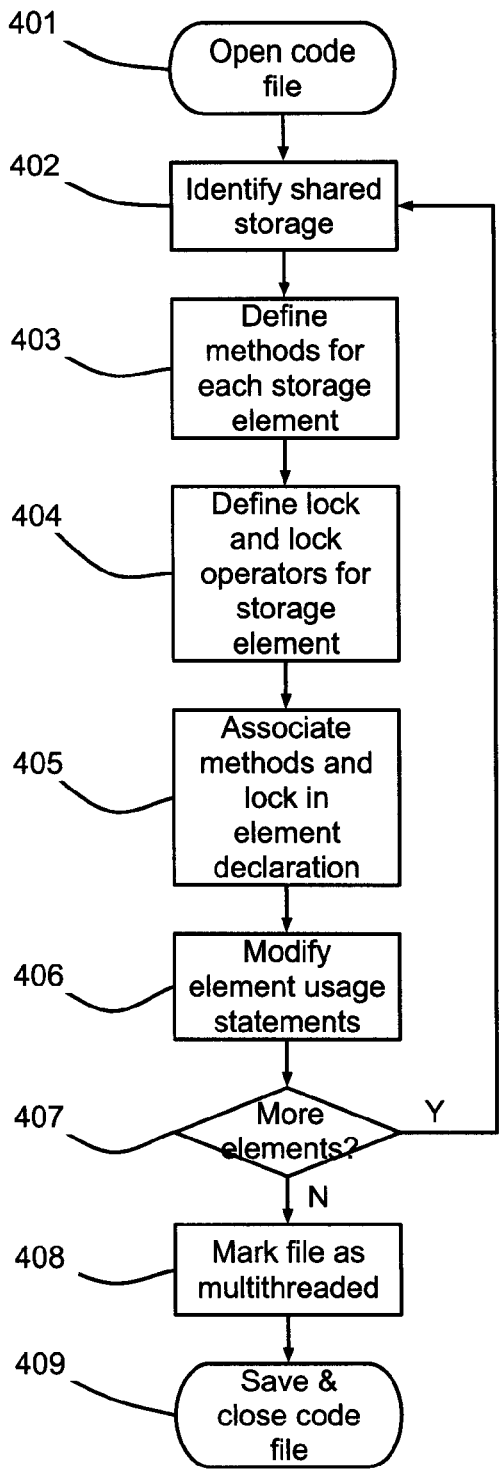
FIGS. 4 and 5 are flow charts illustrating processing performed in the software development system of FIG. 1.

The code processing performed when modifying the single threaded code 205 for processing by the pre-processor 203 will now be described in further detail with reference to FIG. 4. At step 401, the single threaded code file is opened in the code editor 202 and processing moves to step 402. At step 402, the code is analyzed to identify any storage elements in the code that may be shared by multiple processing threads and when such an element is identified, processing moves to step 403. At step 403, a set of processes in the form of methods, are created for operating on the identified shared storage element when recast as an object. The defined methods are stored in the pre-processor instructions 207. Processing then moves to step 404 where a lock mechanism is defined for the identified shared storage element. The lock mechanism includes a lock flag that indicates whether or not the lock is held for a given processing thread.

Processing then moves to step 405 where the defined methods and locking mechanism are associated with the shared storage element via a modified storage element declaration substituted in the software code for the original declaration of the storage element. Processing then moves to step 406 where each use statement for the identified storage element is modified to a call to a corresponding one of the defined methods. In addition, locking is added where appropriate. Processing then moves to step 407 where a search is performed for any further shared storage elements. If a further shared storage element is identified processing returns to step 402 and proceeds as described above. If no further shared storage elements can be identified then processing moves to step 408 where the file is marked as having been prepared for processing by the pre-processor 203 to produce multithreaded code. Processing then moves to step 409 where the file is saved and closed.

Figure 5:
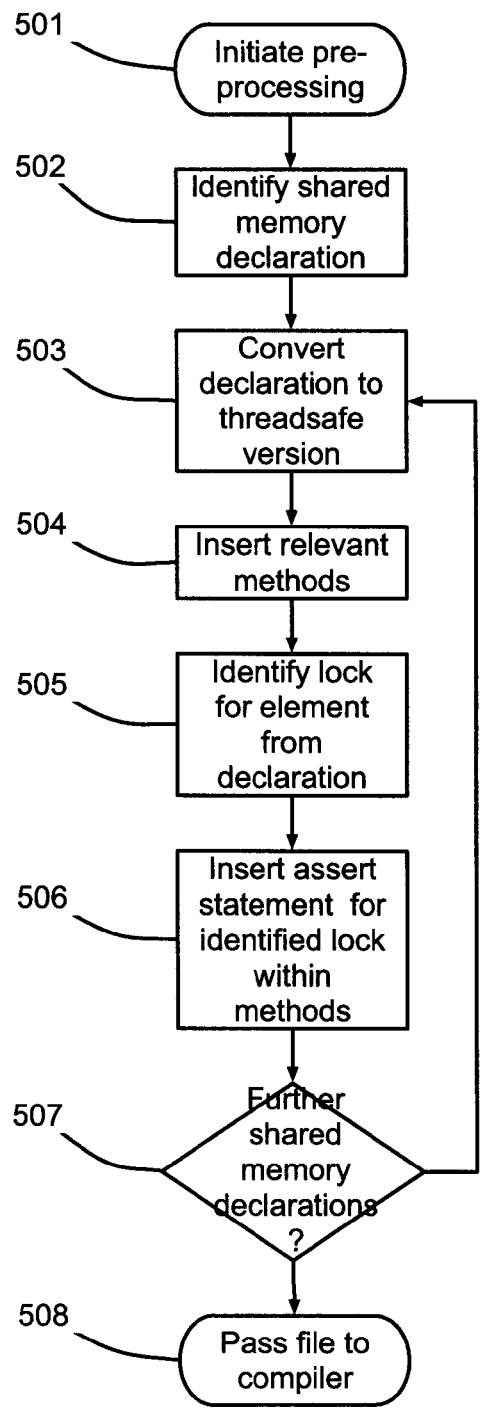

The processing performed by the pre-processor 203 when processing the modified single threaded code will now be described in further detail with reference to FIG. 5. At step 501, pre-processing of the modified single threaded code 205 is initiated and processing moves to step 502. At step 502 the code is searched to identify any modified shared storage element declarations and once identified, processing moves to step 503. At step 503, the modified shared storage element declaration is substituted for a new declaration of the shared storage element as an object. Processing then moves to step 504 where the defined methods for operating on the newly declared object are inserted into the code and processing moves to step 505. At step 505, the lock associated with the shared storage element is identified from the modified declaration and processing moves to step 506. At step 506, an assert statement for the flag associated with the identified lock is placed within each inserted method and processing moves to step 507. At step 507, the code is searched to identify any modified shared storage element declarations and if identified, processing returns to step 503 and proceeds as described above. If no further modified shared storage element declarations are identified, processing moves to step 508 where the pre-processed file is passed to the compiler 204 for compilation into the threadsafe software code 206.

The modified shared storage element can be treated as a macro used by the pre-processor to provide the threadsafe version of the variable via the associated methods and locks. In another embodiment, the insertion of the lock assertion statements may be controlled via a pre-processor option to include lock assertion statements globally or just for selected sections of software. In other words, the options may enable or disable the insertion of assert statements for different sections of software code, such as code files. This option enables the code to be regression tested to detect inappropriate use of locks after a more manageable set of changes. In another embodiment, a compile option is provided to omit all lock assertion statements from the code. For example, lock assertion statements may be of most use during the development of a section of software. Once, however, the development is complete, the shipped version of the code may be compiled without lock assertion statements.

In a further embodiment, the methods for operating on shared objects and for operating locks, including asserting whether or not a lock is in operation for a given thread, are obtained from a predefined set or library of such methods. The predefined set or library may be produced by a third party. A system for automatically selecting appropriate methods may be provided.

In another embodiment, the methods may be arranged to include locking mechanisms.

As will be understood by those skilled in the art, different types of locking mechanisms may be provided, each lock having a specific application. The lock assertion statements may be placed at other suitable points within a respective method. The lock assertion statements may be arranged to flag a locking error in any suitable manner. For example, a lock assertion statement may result simply in a flag being raised or may cause the program to bend and provide diagnostic data such as a memory dump.

It will be understood by those skilled in the art that the apparatus that embodies a part or all of the present invention may be a general-purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method for processing software for use in a multithreaded processing environment, said method comprising the steps of:
   identifying a storage element in a portion of single threaded software code, wherein said storage element is sharable between two or more processing threads in a multithreaded processing environment, in which said storage element declaration is one of a predetermined set of identified storage element declarations in said software code;
   converting said portion of single threaded software code for use in a multithreaded processing environment by recasting said storage element as an object and any statements operating on said storage element as respective methods on said object;
   applying a locking mechanism to said identified storage element; and
   automatically inserting a lock verification mechanism in each said respective method, said lock verification mechanism being arranged to determine whether said applied locking mechanism has locked said identified shared storage element for a given processing thread in said multithreaded processing environment, prior to use of said identified shared storage element by said processing thread.

2. A method according to claim 1 in which a predetermined association is provided between said locking mechanism and said storage element declaration.

3. A method according to claim 1 in which said locking mechanism is selected from a predetermined set of provided locking mechanisms.

4. A method according to claim 1 in which a predetermined set of methods for operating on said storage element is associated with said storage element declaration.

5. A method according to claim 1 in which said software code comprises a plurality of sections and said step of automatically inserting a lock verification mechanism is arranged for selective enablement for a given section.

6. A method for processing software for use in a multithreaded processing environment, said method comprising the steps of:
   identifying a storage element in a portion of single threaded software code, wherein said storage element is sharable between two or more processing threads in a multithreaded processing environment;
   converting said portion of single threaded software code for use in a multithreaded processing environment and applying a locking mechanism to any statements operating on said identified storage element; and
   automatically inserting a lock verification mechanism in said software code, said lock verification mechanism being arranged to determine whether said locking mechanism has locked said identified shared storage element for a given processing thread in said multithreaded processing environment, prior to any use of said identified shared storage element by said processing thread.

7. An apparatus for processing software for use in a multithreaded processing environment, said apparatus being operable to:
   identify a storage element in a portion of single threaded software code, wherein said storage element is sharable between two or more processing threads in a multithreaded processing environment, in which said storage element declaration is one of a predetermined set of identified storage element declarations in said software code;
   convert said portion of single threaded software code for use in a multithreaded processing environment by recasting said storage element as an object and any statements operating on said storage element as respective methods on said object;
   apply a locking mechanism to said identified storage element; and
   automatically insert a lock verification mechanism in each said respective method, said lock verification mechanism being arranged to determine whether said applied locking mechanism has locked said identified shared storage element for a given.

8. An apparatus according to claim 7 in which a predetermined association is provided between said locking mechanism and said storage element declaration.

9. An apparatus according to claim 7 in which said locking mechanism is selected from a predetermined set of provided locking mechanisms.

10. An apparatus according to claim 7 in which a predetermined set of methods for operating on said storage element is associated with said storage element declaration.

11. An apparatus according to claim 7 in which said software code comprises a plurality of sections and said automatic insertion of a lock verification mechanism is arranged for selective enablement for a given section.

12. An apparatus for processing software for use in a multithreaded processing environment, said apparatus being operable to:
   identify a storage element in a portion of single threaded software code, wherein said storage element is sharable between two or more processing threads in a multi-threaded processing environment;

convert said portion of single threaded software code for use in a multithreaded processing environment and applying a locking mechanism to any statements operating on said identified storage element; and automatically insert a lock verification mechanism in said software code, said lock verification mechanism being arranged to determine whether said locking mechanism has locked said identified shared storage element for a given processing thread in said multithreaded processing environment, prior to any use of said identified shared storage element by said processing thread.

* * * * *